US009032096B2

(12) United States Patent
Jawahar et al.

(10) Patent No.: US 9,032,096 B2
(45) Date of Patent: May 12, 2015

(54) REDUCING THE IMPACT OF NETWORK LATENCY ON APPLICATION PERFORMANCE

(75) Inventors: Janardhanan Jawahar, San Jose, CA (US); Balas Natarajan Kausik, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 2871 days.

(21) Appl. No.: 11/014,922

(22) Filed: Dec. 17, 2004

(65) Prior Publication Data

US 2008/0172488 A1 Jul. 17, 2008

Related U.S. Application Data

(60) Provisional application No. 60/531,018, filed on Dec. 17, 2003.

(51) Int. Cl.
*G06F 15/16* (2006.01)
*H04L 12/54* (2013.01)
*G06F 17/30* (2006.01)
*H04L 12/911* (2013.01)
*H04L 12/927* (2013.01)
*H04L 29/08* (2006.01)

(52) U.S. Cl.
CPC ...... *H04L 12/5695* (2013.01); *G06F 17/30902* (2013.01); *H04L 47/748* (2013.01); *H04L 47/801* (2013.01); *H04L 67/2823* (2013.01); *H04L 67/34* (2013.01); *H04L 67/2814* (2013.01); *H04L 67/02* (2013.01); *H04L 67/32* (2013.01); *H04L 67/28* (2013.01)

(58) Field of Classification Search
USPC .......................................... 709/246
See application file for complete search history.

(56) References Cited

U.S. PATENT DOCUMENTS

| | | | | |
|---|---|---|---|---|
| 5,727,159 A * | 3/1998 | Kikinis | .......................... | 709/246 |
| 6,073,168 A * | 6/2000 | Mighdoll et al. | ............... | 709/217 |
| 6,085,234 A * | 7/2000 | Pitts et al. | ....................... | 709/217 |
| 6,272,536 B1 | 8/2001 | van Hoff et al. | | |
| 6,317,885 B1 * | 11/2001 | Fries | .............................. | 725/109 |
| 7,013,322 B2 * | 3/2006 | Lahr | ............................... | 709/201 |
| 7,072,984 B1 * | 7/2006 | Polonsky et al. | ............... | 709/246 |

(Continued)

FOREIGN PATENT DOCUMENTS

EP         0434041 B1     6/1991

OTHER PUBLICATIONS

Kendrick, James. "Bitstream ThunderHawk Browser". Dec. 4, 2003. BostonPocketPC. pp. 1-7.*

*Primary Examiner* — Imad Hussain
(74) *Attorney, Agent, or Firm* — Meunier Carlin & Curfman, LLC

(57) ABSTRACT

An exemplary method performed by a proxy server located between a content server and a client browser for reducing effects of network latency therebetween comprises intercepting a request from the client browser for a resource at the content server, obtaining a response by the content server to the request, determining that the response would, if unmodified, require a plurality of communications between the content server and the client browser in the absence of the proxy server, modifying the response to reduce a network latency associated with the plurality of communications for accessing information located externally to the response, and transmitting the modified response to the client browser for use thereby.

68 Claims, 4 Drawing Sheets

(56) References Cited

U.S. PATENT DOCUMENTS

| | | | |
|---|---|---|---|
| 7,082,476 B1* | 7/2006 | Cohen et al. | 709/246 |
| 7,139,811 B2* | 11/2006 | Lev Ran et al. | 709/217 |
| 7,428,573 B2* | 9/2008 | McCanne et al. | 709/203 |
| 7,500,188 B1* | 3/2009 | Trapani et al. | 715/273 |
| 7,840,707 B2* | 11/2010 | Jerrard-Dunne | 709/246 |
| 8,069,225 B2* | 11/2011 | McCanne et al. | 709/219 |
| 2001/0054084 A1* | 12/2001 | Kosmynin | 709/218 |
| 2002/0010761 A1* | 1/2002 | Carneal et al. | 709/219 |
| 2002/0099850 A1* | 7/2002 | Farber et al. | 709/245 |
| 2003/0034905 A1* | 2/2003 | Anton et al. | 341/51 |
| 2003/0120752 A1* | 6/2003 | Corcoran | 709/219 |
| 2003/0137522 A1* | 7/2003 | Kaasila et al. | 345/619 |
| 2004/0049737 A1* | 3/2004 | Simon Hunt et al. | 715/513 |
| 2004/0133848 A1* | 7/2004 | Hunt et al. | 715/500 |
| 2004/0205149 A1* | 10/2004 | Dillon et al. | 709/217 |
| 2004/0255048 A1* | 12/2004 | Lev Ran et al. | 709/249 |
| 2005/0021863 A1* | 1/2005 | Jungck | 709/246 |
| 2005/0044242 A1* | 2/2005 | Stevens et al. | 709/228 |
| 2005/0108517 A1* | 5/2005 | Dillon et al. | 713/150 |
| 2006/0200503 A1* | 9/2006 | Dosa et al. | 707/203 |
| 2006/0218304 A1* | 9/2006 | Mukherjee et al. | 709/246 |
| 2007/0174428 A1* | 7/2007 | Lev Ran et al. | 709/218 |
| 2008/0320151 A1* | 12/2008 | McCanne et al. | 709/228 |
| 2009/0125809 A1* | 5/2009 | Trapani et al. | 715/273 |
| 2010/0268773 A1* | 10/2010 | Hunt et al. | 709/203 |
| 2012/0135726 A1* | 5/2012 | Luna et al. | 455/422.1 |

* cited by examiner

REDUCING THE IMPACT OF NETWORK LATENCY ON APPLICATION PERFORMANCE

REFERENCE TO RELATED APPLICATION

This application claims priority to provisional patent application filed on Dec. 17, 2003, bearing application Ser. No. 60/531,018, which is hereby incorporated by reference in its entirety for all purposes.

FIELD

This patent relates generally to accessing content over a network. More specifically, this patent relates to minimizing the impact of network latency on the response time to a client's request for a resource from a remote content server.

BACKGROUND

Browser-based applications are deployed and managed centrally, and therefore are inexpensive in comparison to client/server applications. Specifically, in contrast to client/server applications, browser-based applications can be accessed ubiquitously from any web-browser, and therefore do not require the maintenance of specialized software on each user's desktop. On the downside, browser applications suffer from performance issues in that responding to client actions may take several network roundtrips to the server. In contrast, client/server applications carry significant computing intelligence on the client, thereby providing significantly better performance.

Round trips (i.e., multiple communications) on the network can take anywhere from a fraction of a millisecond to more than a second, depending on the type of network and the geographic distance between the client and the server. For example, on a campus Local Area Network (LAN), the latency is typically 0.1 ms. As a second example, the latency on a high-speed land line between New York and Tokyo is ~400 ms. As a third example, the latency between any two terrestrial points on a satellite link is about 1.5 seconds. In light of this, the performance of browser-based applications depends substantially on the number of network roundtrips required to respond to a typical client action. A response that requires 16 round trips would take well over 7 seconds when the client is in Tokyo and the server is in New York. It is therefore desirable to minimize the number of network roundtrips involved in each response of the application to client action.

In general, application developers tend to focus on providing the best functionality in the application, but pay little attention to performance issues. A market therefore exists for technology to optimize the performance of applications a posteriori by examining the request/response interactions between the client and the server. The situation is similar to that of application development, where application developers write software with a view to richness of functionality, leaving it to compilers and optimizing processors to deliver performance afterwards.

With regard to the impact of network latency on application performance, application developers often construct files (e.g., web pages) that, when displayed, involve multiple objects (e.g., frames). For example, a customer service application at an insurance company may includes files that, when accessed, display web pages having several frames such as an "account information" frame, a "contact information" frame, a "policy claims" frame etc. This organization of the frames is convenient to the application developer because the application modules for different frames can be separately developed then the modules can be reused in multiple pages in any combination. For example, the "account info" frame may occur in every page or just in some of the company's pages. This allows the application developer to rapidly develop complex applications in a modular fashion.

On the downside, requiring the browser to download many independent objects (e.g., frames) to complete a response to a client request can have severe negative impact on performance. In general, each object is requested by the browser independently; therefore, a web page including multiple objects will require several network roundtrips. This causes the impact of network latency to become manifold thereby leading to poor performance.

Other techniques used by application developers can also impact network performance. For example, application developers often implement so-called server-based redirects. A developer may construct an application to comprise several functional modules. When a client requests a URL, a content server may process the URL at a nominal control module which then redirects the client to another module for handling the request. Redirection of client requests can have severe performance impact because each client request must travel the network twice—once to the server's control module and back, and a second time to another (redirected) server module and back.

Network latency can have varying impact on the performance of web and other network applications involving the fetching of an object that in turn requires the fetching of other objects that are external to the originally fetched object. When the latency between the client and the server is small, network latency has limited impact on performance. When the latency is large (e.g., of the order of a second), as is the case when the client and the server are separated by a significant geographic distance, network latency can degrade application performance significantly.

Thus, a market exists for techniques to minimize the impact of network latency on application performance a posteriori to application development. Optimization can be carried out dynamically as a client interacts with an application so that changes to the application (e.g., on the server or client computers) are not required (but may be optional depending on design choice).

SUMMARY

An exemplary method performed by a proxy server located between a content server and a client browser for reducing effects of network latency therebetween comprises intercepting a request from the client browser for a resource at the content server, obtaining a response by the content server to the request, determining that the response would, if unmodified, require a plurality of communications between the content server and the client browser in the absence of the proxy server, modifying the response to reduce a network latency associated with the plurality of communications for accessing information located externally to the response, and transmitting the modified response to the client browser for use thereby.

Other embodiments and implementations are also described below.

DETAILED DESCRIPTION

I. Overview

Exemplary techniques for reducing network latency are disclosed herein.

Section II describes an exemplary network environment.

Section III describes an exemplary process for reducing network latency caused by a server redirect.

Section IV describes exemplary processes for reducing network latency when a content server's response is a resource including multiple embedded objects.

Section V describes other aspects and considerations.

II. An Exemplary Network Environment

Figure 1:
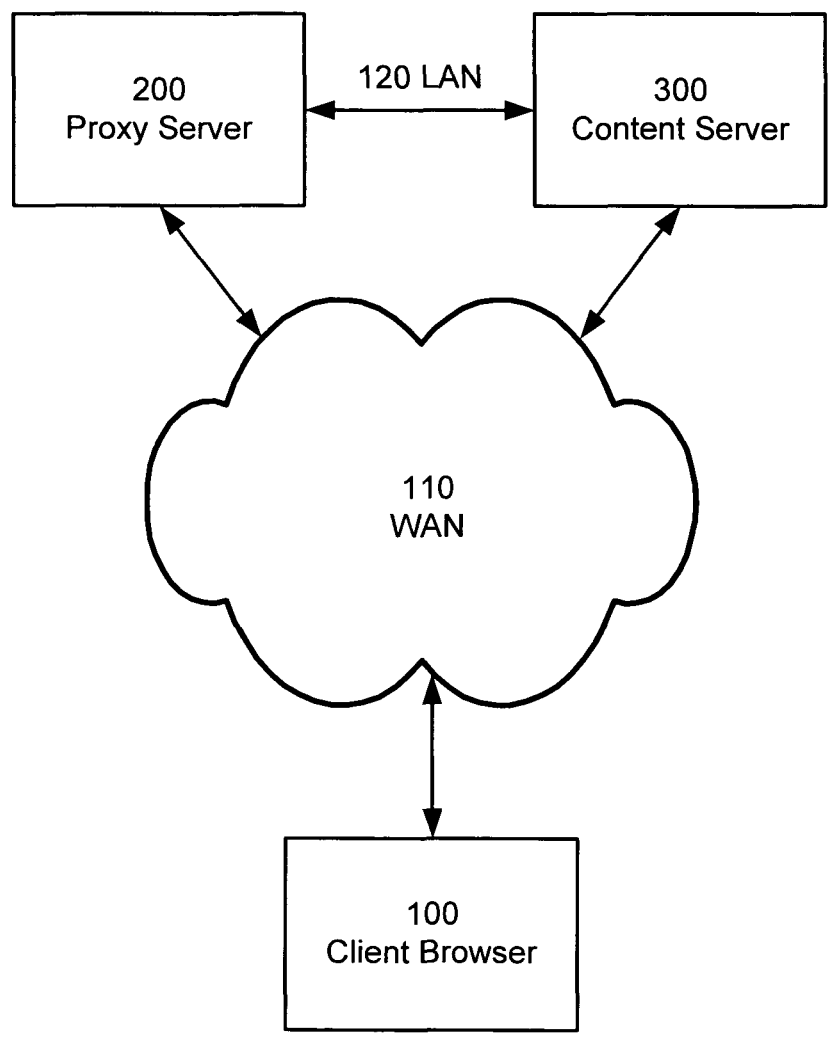
FIG. 1 illustrates an exemplary network environment.

FIG. 1 illustrates an exemplary environment including a client browser 100 connected over a Wide Area Network (WAN) 110 to, and accessing content from, a content server 300. In an exemplary embodiment, the proposed system is deployed as a transparent proxy server 200 located on the network immediately in front of the content server 300, and connected on a high-speed low latency Local Area Network (LAN) 120 to the content server 300.

When a user using the client browser 100 requests a URL, the proxy server 200 intercepts the request, and forwards the request to the content server 300. The content server 300 then responds to the proxy server 200. The proxy server 200 examines and modifies the response in accordance with various embodiments to be described herein then forwards the modified response to the client browser 100.

Those skilled in the art will realize that the proxy server 200 can be implemented in any combination of software and/or hardware, depending on the technical and financial requirements of the particular implementation. For example, a software implementation could be run on a general purpose computer having a processor, one or more memories or other computer-readable media, and appropriate I/O interfaces for connections to the content server 300 and the client browser 100, via the LAN 120 or the WAN 100, respectively. Or, a hardware implementation could be deployed using ASICs, PALs, PLAs, or still other forms of hardware now known or hereafter developed.

Further, the computer-readable media can store data and logic instructions (which, when executed, implement the processes described herein) that are accessible by the computer or the processing logic within the hardware. Such media might include, without limitation, hard disks, flash memory, random access memories (RAMs), read only memories (ROMs), and the like.

Figure 2:
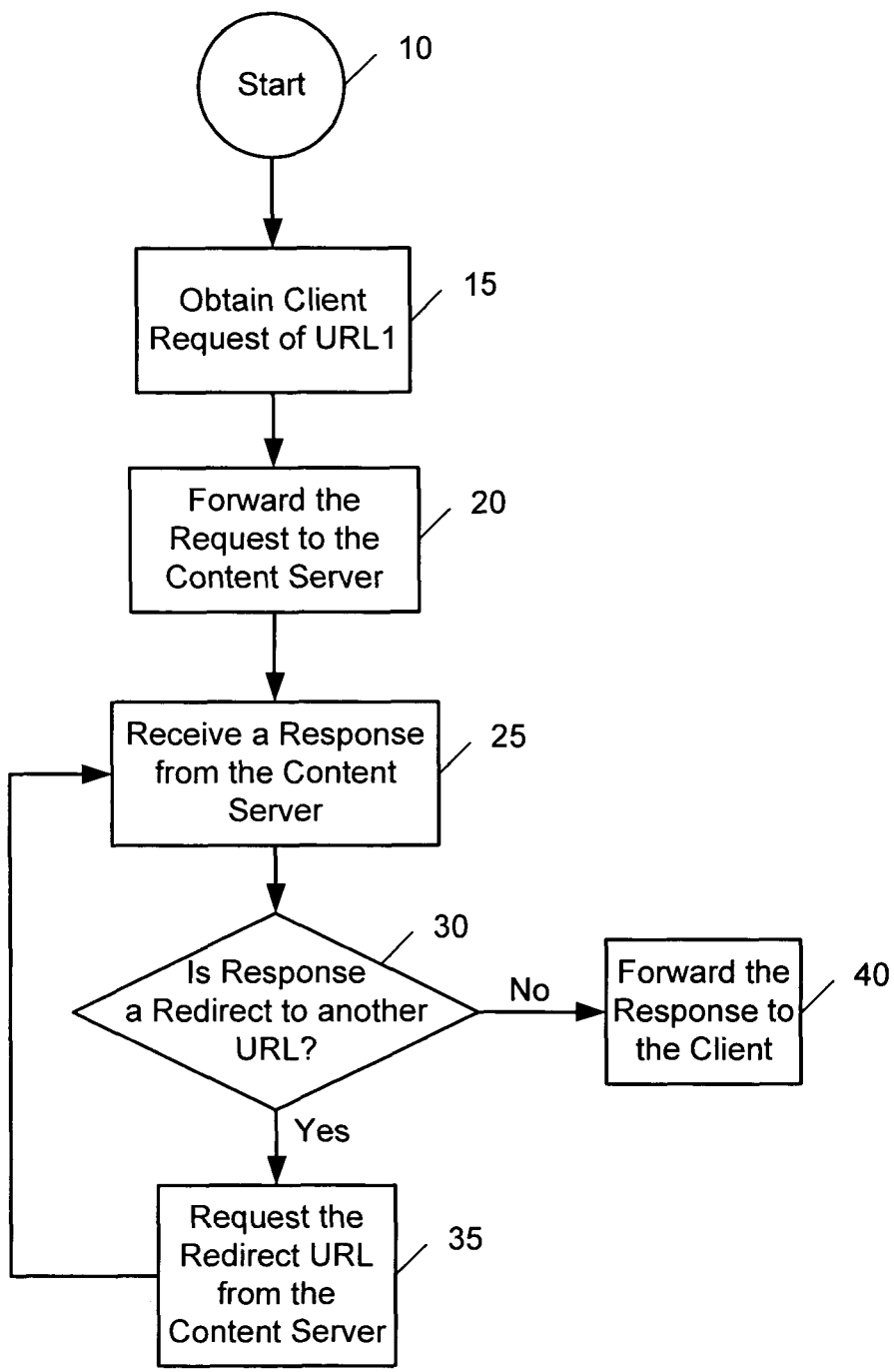
FIG. 2 illustrates an exemplary process for reducing network latency caused by server redirects.

III. An Exemplary Process for Reducing Network Latency Caused by Server Redirects FIG. 2 illustrates an exemplary process for reducing network latency caused by server redirects. Server redirects are instances where a content server's response to a client request is a redirect to another Universal Resource Locator (URL) identifying a unique resource. In general, each URL uniquely identifies a resource. A resource can be any type of data, including, without limitation, a frame, a text file, an image file, a voice file, any other types of data, and/or a combination thereof. For ease of explanation, the terms resource and object may be used interchangeably throughout this patent.

The exemplary process begins at block 10.

At block 15, the proxy server 200 obtains a client request for URL1. The client request is sent by the client browser 100 via the WAN 110 and destined for the content server 300. In an exemplary implementation, the proxy server 200 intercepts the client request. The request interception can be transparent to the client browser 100.

At block 20, the proxy server 200 forwards the request to the content server 300 via the LAN 120.

At block 25, the proxy server 200 receives the content server's 300 response to the request. In an exemplary implementation, the proxy server 200 examines the response after receiving it.

At block 30, the proxy server 200 determines whether the response is a redirect to another URL (e.g., URL2).

If so, at block 35, the proxy server 200 requests the redirect URL (e.g., URL2) from a content server. The content server may or may not be the same content server as the one for URL1 (i.e., content server 300). The process returns to block 25, where the proxy server 200 receives a response to the redirect URL from a content server. If the new response is not yet another redirect to yet another URL (e.g., URL3), then the process continues to block 40 where the new response is forwarded to the client browser 100.

In this exemplary embodiment, the proxy server 200 intercepts a redirect response from the content server 300 and requests the resource identified by the redirect URL via the high-speed low latency LAN 120. Therefore, network latency between the client browser 100 and the content server 300 is reduced by eliminating one roundtrip between them over the higher latency WAN 110 to request the resource identified by the redirect URL.

Figure 3:
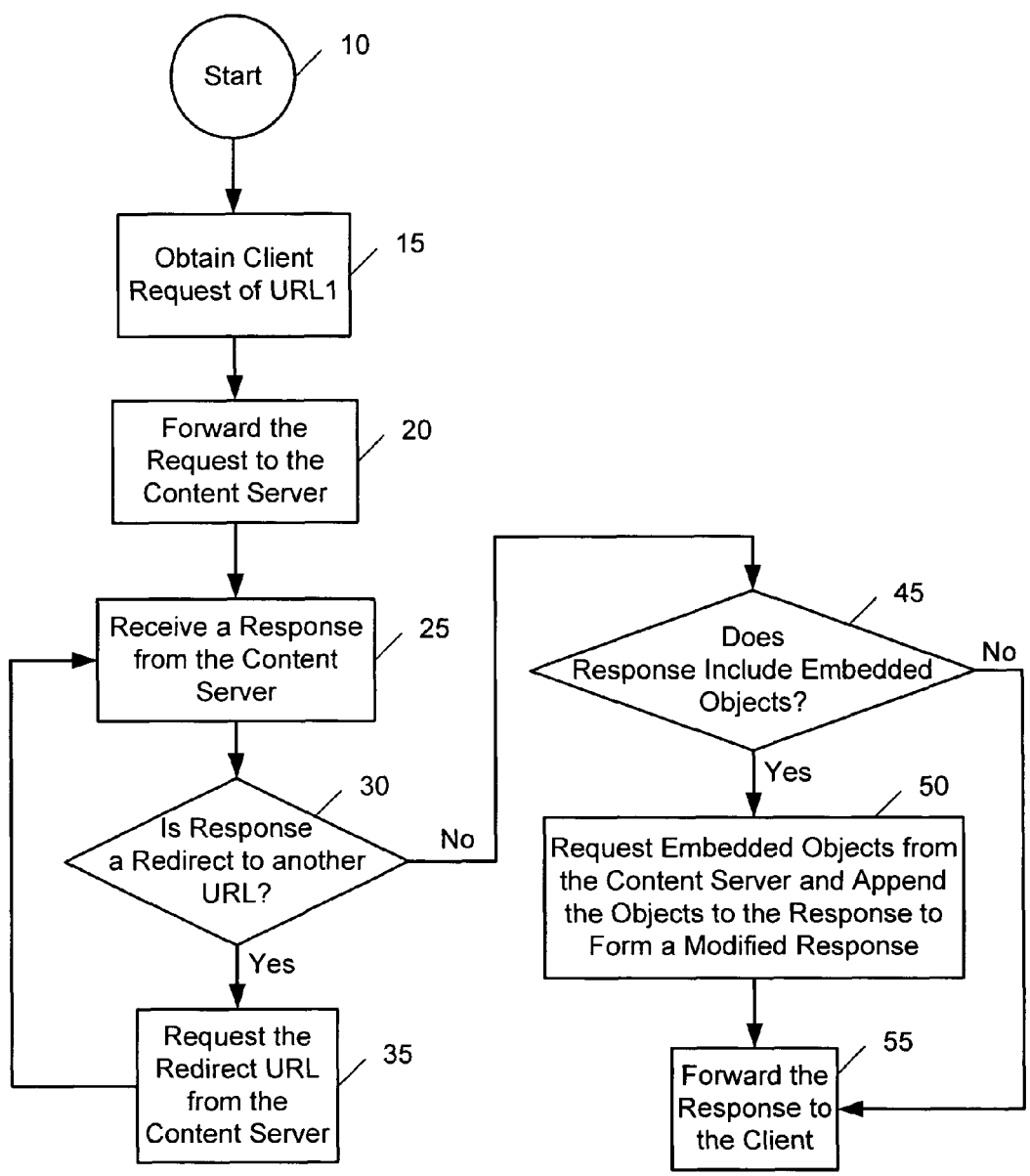
FIG. 3 illustrates an exemplary process for reducing network latency when processing requested resources containing embedded objects.
Figure 4:
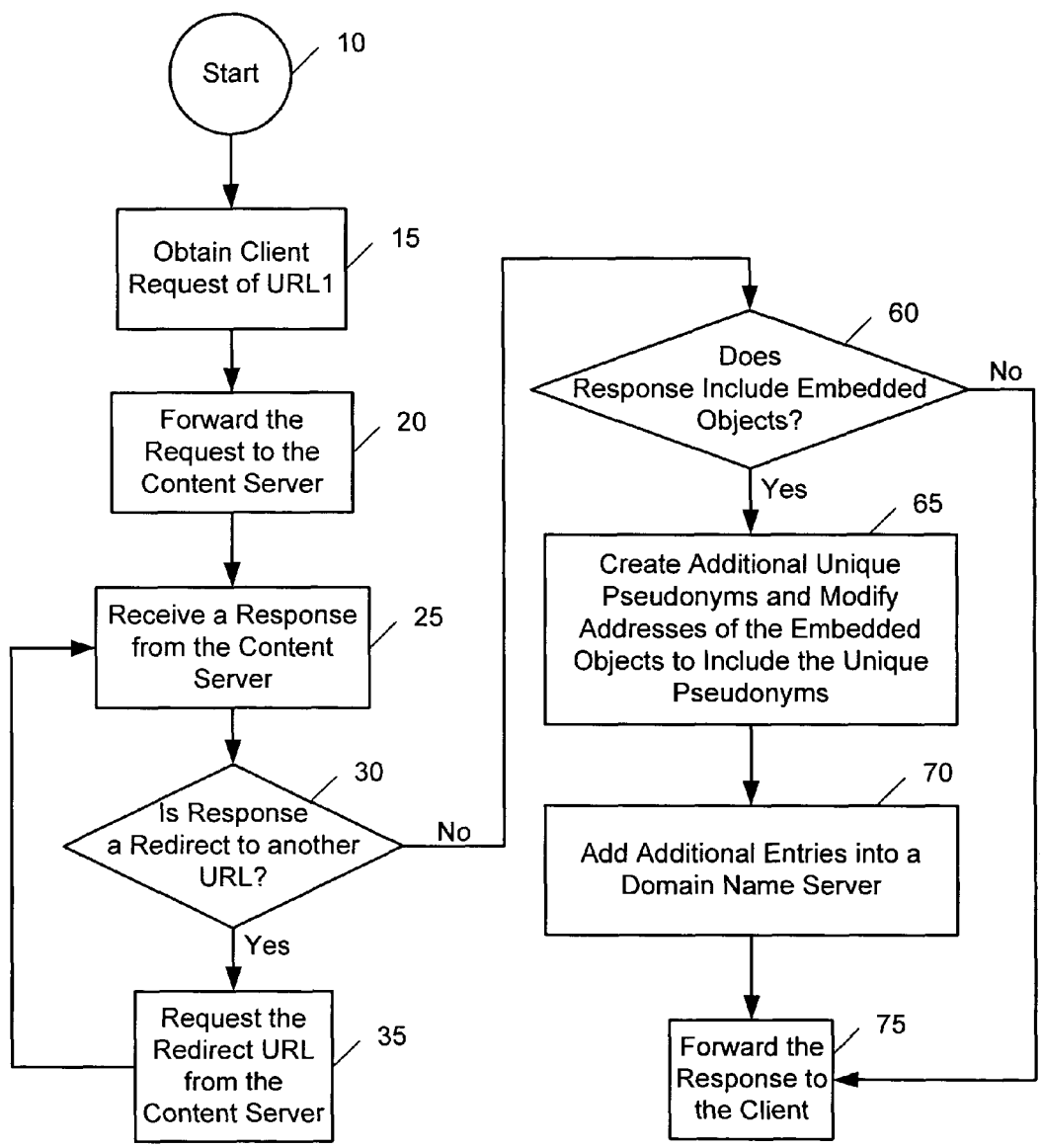
FIG. 4 illustrates another exemplary process for reducing network latency when processing requested resources containing embedded objects.

IV. Exemplary Processes for Reducing Network Latency when a Requested Resource Includes Multiple Embedded Objects Network latency can also occur when a response (e.g., a resource) from the content server 300 to a client request (e.g., made via the client browser 100) includes multiple embedded objects. FIGS. 3 and 4 illustrate two exemplary processes for reducing network latency by modifying the response from the content server 300.

A. Reducing Network Latency by Obtaining and Appending the Embedded Objects to the Response FIG. 3 illustrates an exemplary process performed by the proxy server 200 that includes the same blocks 10-35 of FIG. 2.

After determining that a response from the content server 300 is not a redirect to another URL, at block 45, the proxy server 200 determines whether the response includes any embedded objects. For ease of explanation only, this response will be referred to as the original response.

If so, at block 50, the proxy server 200 requests the embedded objects from the content server 300 via the LAN 120 and appends the objects to the original response to form a modified response. In an exemplary implementation, the embedded objects are separated from the parent resource by a header. In addition, each object is also separated from another object by a header. In an exemplary implementation, a header may identify the resource location of each object appended immediately following the header.

The modified response can be represented in any desired format, subject to the ability of the client browser 100 to recognize such format. For example, a well-known format that could be used is the so-called Multipurpose Internet Mail Extension HTML (a.k.a. MIME HTML, MHTHL or MHT). The MIME HTML format, developed by a committee of the standards setting body known as the Internet Engineering Task Force, is well known to those skilled in the art, and need not be described in greater detail herein. For example, see the specification for this format at www.ietf.org/rfc/rfc2110.txt and www.ietf.org/rfc/rfc2557.txt. Current versions of some popular browsers, including Microsoft's Internet Explorer, are configured to recognize (and some can even write) files in this format.

At block 55, the proxy server 200 forwards the modified response to the client browser 100 via the WAN 110. The client browser 100 can render the parent resource as well as the embedded objects by opening the modified response in accordance with the requirements of the implemented format, without having to incur additional roundtrips to request and obtain the objects embedded in the parent resource.

Referring back to block 45, if the original response from the content server 300 does not include any embedded objects, then at block 55, the proxy server 200 forwards the original response to the client browser 100 via the WAN 110.

In this exemplary embodiment, the proxy server 200 intercepts an original response from the content server 300 and directly requests the content server 300 for any objects embedded in the original response via the high-speed low latency LAN 120. Therefore, network latency between the client browser 100 and the content server 300 is reduced by eliminating additional roundtrips between them over the higher latency WAN 110 for retrieving any embedded objects.

B. Reducing Network Latency by Creating Additional Unique Pseudonyms

Client browsers 100 are typically hard-coded by the manufacturers to automatically open two parallel TCP/IP connections per uniquely named content server. Without proxy server 200 intervention, a resource having multiple embedded objects will be retrieved directly by the client browser 100 via the two connections opened for the content server 300 of the resource. In this example, a first connection will be used to retrieve the parent resource, and a second connection will be used to retrieve any embedded objects one-by-one until either the first connection becomes free or when all embedded objects have been retrieved. In the first scenario, the first connection can be used in parallel with the second connection to retrieve any remaining embedded objects. If more connections could be opened, then network latency can be correspondingly reduced. FIG. 4 illustrates an exemplary process performed by the proxy server 200 to enable the client browser 100 to open additional connections.

FIG. 4 includes the same blocks 10-35 of FIG. 2.

After the proxy server 200 determines that a response from the content server 300 is not a redirect to another URL, at block 60, the proxy server 200 determines whether the response includes any embedded objects. For ease of explanation only, this response will be referred to as the original response.

If the original response includes embedded objects, at block 65, the proxy server 200 creates additional unique pseudonyms of the content server 300 and modifies the addresses of the embedded objects in the original response to include the unique pseudonyms (to form a modified response). The impact of this process performed by the proxy server 200 can best be illustrated by example.

Consider a parent resource identified by the URL www.bank.com. The parent resource includes multiple embedded objects identifiable by the following URLs:

```
<img src = "http://www.bank.com/button1.jpg">
<img src = " http://www.bank.com/button2.jpg">
<img src = " http://www.bank.com/clock.jpg">
<img src =" http://www.bank.com/footer.gif " >
```

In the absence of the proxy server 200, when the client browser 100 receives the parent resource, it will attempt to fetch the embedded objects (e.g., image files) using the two connections opened for the content server www.bank.com. Assuming both connections are free (i.e., one of the connections has already finished retrieving the parent resource), the client browser 100 will fetch the first two objects "button1.jpg" and "button2.jpg" followed by the next two, "clock.jpg" and "footer.gif."

By creating additional unique pseudonyms for the content server 300, the proxy server 200 can enable the client browser 100 to open more connections (e.g., 4 connections) to be used to retrieve the embedded objects in parallel. For example, the proxy server 200 creates two unique pseudonyms: server1.bank.com and server2.bank.com for the content server www.bank.com, and modifies the addresses of the embedded objects in the parent resource to reference the pseudonyms. Thus, the embedded objects can now be identified by:

```
<img src = "http://www.server1.bank.com/button1.jpg">
<img src = "http://www.server1.bank.com/button1.jpg">
<img src = "http://www.server2.bank.com/clock.jpg">
<img src = "http://www.server2.bank.com/footer.gif">
```

In this example, when the client browser 100 receives the modified response (see block 75), it will open two connections for each of the pseudonym servers, i.e., a total of four connections to the content server, and can retrieve all four embedded objects in parallel.

In order for pseudonyms created by the proxy server 200 for a content server to resolve to the content server, at block 70, the proxy server 200 adds additional entries into a Domain Name Server, one for each pseudonym created by the proxy server 200 so the pseudonym(s) will resolve to the same IP address as the content server (e.g., www.bank.com). In an exemplary implementation, the proxy server 200 may add a single DNS entry having a wildcard character symbol (e.g., an asterisk) preceding (or after) the content server name instead of adding a separate entry per unique pseudonym. In the above example, an entry of the form "*.bank.com" can be added to refer to the content server name of ".bank.com" with any string of wild card characters preceding the name. Alternatively, such DNS entry (i.e., having a wildcard character symbol) can refer to the proxy server 200 which will resolve any address to an appropriate content server.

At block 75, the modified response is forwarded to the client browser 100 to enable it to open additional connections (i.e., more than 2) to access the content server 300.

Referring back to block 60, if the original response does not include any embedded objects, then at block 75, the original response is forwarded to the client browser 100 unmodified.

One skilled in the art will recognize that, depending on design choice, the number of unique pseudonyms to be created by the proxy server 200 may be a default number or a dynamically determined number (e.g., based on the size of the parent resource, the number of embedded objects, and/or any other factors).

In an exemplary implementation, when a parent resource identifies embedded objects by relative URLs (e.g., of the form "./button.jpg"), the proxy server 200 fills in the complete root path to convert the relative URL to an absolute URL, then introduces a created pseudonym to the absolute URL. To illustrate using the above example, if the parent resource makes a reference to an embedded object by a relative URL "button.jpg," the proxy server 200 will fill in the complete root path to convert the relative URL to an absolute URL www.bank.com/button.jpg, and then introduce a pseudonym of the content server to modify the absolute URL to a modified URL www.server1.bank.com/button.jpg.

In other exemplary implementations, the proxy server 200 is configured to introduce the same pseudonym for each object if the object is referenced multiple times (e.g., within the same parent resource). This feature can prevent retrieval of the same object multiple times. In one implementation, the absolute URL (or the content) of an object can be hashed to the space of a pseudonym.

In this exemplary embodiment, the proxy server 200 intercepts an original response from the content server 300, creates additional unique pseudonyms of the content server 300, modifies the addresses of embedded objects in the response, and sends the modified response to the client browser 100. The modified response enables the client browser 100 to open additional connections to the content server 300 to thereby retrieve the embedded objects faster. Therefore, network latency between the client browser 100 and the content server 300 is reduced.

V. Other Aspects and Considerations

A. Latency Testing

The process of intercepting a file (e.g., a request from the client browser 100 or a response from the content server 300) at the proxy server 200, appending external objects or otherwise form a modified file (e.g., a modified response), and transmitting that modified file to a client will involve some overhead and therefore, will introduce some latency of its own. Additional latency might be introduced by the overhead associated with reading a modified file (e.g., a MIME HTML file) at the client browser 100 computer. In most cases, the additional latency will be more than offset by the reduction in latency associated with the savings in eliminated round trips (or by opening additional server connections). However, this is not always the case. For example, the overhead may exceed the savings when requesting content from a content server 300 that is very close to the client browser 100, or when the network is very lightly loaded. As one optional aspect, it may therefore be useful to perform latency testing and condition the operation of the modification (of the original response) on the outcome of such testing. In other situations, the overall effect of differential network speeds between the content-server-to-proxy legs and the proxy-to-client legs might also render the modification operation moot.

B. Client Application Testing

As mentioned above, some response modifications may require the client browser 100 to be able to read a modified response. If a modified response is sent to a client browser that cannot read it, not only will no savings result, but the original response may have to be retransmitted in any case. Thus, in another exemplary embodiment, the proxy server 200 might be configured to interrogate the client browser 100 (e.g., by sending a test message or otherwise) to determine whether the client computer can read a certain file format. If not, the proxy server 200 can either skip the modification, or transmit a supplementary application (via a plug-in, patch, applet, etc.) to invest the client computer with the missing functionality.

C. Caching

Still another optional aspect utilizes caching at the proxy server 200 to further reduce latency. For example, if a commonly requested resource can be found in the proxy server's cache, then one trip back to the content server 300 can be eliminated.

In an optional embodiment, the proxy server 200 could even be equipped with "precomputing" technology to predict that a particular resource will be needed in the future, and to compute that resource ahead of time. This is particularly useful for dynamic content. An exemplary such precomputing technology has been developed by FineGround Networks, Inc. and is described in pending U.S. patent application Ser. No. 10/459,365 filed on Jun. 11, 2003, which application is hereby incorporated by reference in its entirety for all purposes.

VI. Conclusion

As a matter of convenience, the techniques of this patent have been disclosed in the exemplary context of a web-based system in which the user accesses content identified by URLs from a client browser. However, those skilled in the art will readily appreciate that other user access devices, and content identifiers, may also be used. Similarly, it should be appreciated that the proposed techniques will operate on any networked computer, including without limitation, wireless networks, handheld devices, and personal computers. Therefore, exemplary terms such as resource, web, browser, URL and the like should be interpreted broadly to include known substitutes and other equivalents, counterparts, and extensions thereof. Indeed, it should be understood that the technologies disclosed herein are more generally applicable to obtaining virtually any form of resource over a network. Accordingly, the specific exemplary embodiments and aspects disclosed herein are not to be construed as limiting in scope.

Therefore, the inventions should not be limited to the particular embodiments discussed above, but rather are defined by the claims. Furthermore, some of the claims may include alphanumeric identifiers to distinguish the elements thereof. Such identifiers are merely provided for convenience in reading, and should not necessarily be construed as requiring or implying a particular order of elements, or a particular sequential relationship among the claim elements.

What is claimed is:

1. A method for reducing effects of latency on a network connecting at least a content server and a client browser, the method comprising:
   at a single proxy server located between said content server and said client browser:
      intercepting a request from said client browser for a resource at said content server;
      obtaining a response by said content server to said request;
      evaluating whether said response would, if unmodified, require a plurality of communications by said client browser to said content server in the absence of said single proxy server;
      upon determining that said response would require a plurality of communications:

obtaining information indicated by said response;

modifying said response to include the obtained information to reduce a network latency by causing a reduction in said plurality of communications by eliminating at least one additional access of said information by said client browser; and transmitting said modified response to said client browser for use thereby; and upon determining that said response would not require a plurality of communications:

transmitting said response to said client browser for use thereby.

2. The method of claim 1, wherein:

said obtaining a response by said content server to said request is performed over a first network that is relatively faster than a second network; and said transmitting said modified response to said client browser is performed over said second network that is relatively slower than said first network.

3. The method of claim 2, wherein said first network is a LAN, and said second network is a WAN.

4. The method of claim 1, wherein said modifying said response includes:

obtaining said external information; and modifying said response to include said external information.

5. The method of claim 1, wherein said response includes a redirection to another resource at a resource location distinct from a resource location from which said response was received.

6. The method of claim 5 where said resource locations are URLs.

7. The method of claim 1, wherein said response includes references to a plurality of additional resources.

8. The method of claim 7 further comprising:

obtaining the references to the plurality of additional resource locations; and appending the references to the plurality of resource locations of said additional resources to said response, each reference being a redirect URL.

9. The method of claim 7, wherein said modifying said response includes:

enabling said client browser to open a plurality of connections to servers containing said additional resources, beyond those connections ordinarily available without modifying said response, in order to download said additional resources in a parallel fashion.

10. The method of claim 7, wherein said modifying said response includes:

creating one or more unique pseudonyms for a source of said additional resources; and modifying resource locations of said additional resources in said response to include said unique pseudonyms, the one or more unique pseudonyms to enable additional connections with the content server to be opened.

11. The method of claim 10, further comprising:

adding one or more entries into a domain name server to link said unique pseudonyms to said proxy server.

12. The method of claim 10, further comprising:

adding one or more entries into a domain name server to link said unique pseudonyms to said source.

13. The method of claim 12, wherein said source is said content server.

14. The method of claim 10, wherein at least one of said additional resources is multiply-referenced, and further comprising using a common pseudonym for said multiply-referenced additional resource.

15. The method of claim 10, wherein at least one of said additional resources is multiply-referenced, and further comprising generating a common pseudonym for said multiply-referenced additional resource based on its content.

16. The method of claim 10, wherein at least one of said additional resources is multiply referenced, and further comprising generating a common pseudonym for said multiply-referenced additional resource based on its URL.

17. The method of claim 10, wherein at least one of said additional resources is referenced by a relative URL, and further comprising:

converting said relative URL to an absolute URL; and introducing a unique pseudonym to said absolute URL.

18. The method of claim 1, conditioned upon latency testing, including determining and taking into account the effect of differential latency between a server-to-proxy network segment and a proxy-to-client network segment.

19. The method of claim 1, conditioned upon latency testing, including determining that an expected latency reduction exceeds an expected proxy server processing time.

20. The method of claim 1, wherein said obtaining a response by said content server to said request includes obtaining said response from a cache.

21. The method of claim 20, wherein said response was cached from a previous communication.

22. The method of claim 20, wherein said response is precomputed from an expected communication.

23. The method of claim 1, wherein said modified response is in a so-called MIME HTML format.

24. The method of claim 1, conditioned upon determining that said client browser can recognize said modified response.

25. The method of claim 24, further comprising downloading a supplementary application to said client upon determining that said client browser cannot recognize said modified response.

26. A single proxy server to be disposed between a content server and a client browser, for reducing effects of latency on a network communication therebetween, the single proxy server comprising:

a processor; and a computer-readable memory including computer-readable instructions that, when executed using said processor performs operations comprising:

intercepting a request from said client browser for a resource at said content server;

obtaining a response by said content server to said request;

evaluating whether said response would, if unmodified, require a plurality of communications by said client browser to said content server in the absence of said single proxy server;

upon determining that said response would require a plurality of communications:

obtaining information indicated by said response;

modifying said response to include the obtained information to reduce a network latency by causing a reduction in said plurality of communications by eliminating at least one additional access of said information by said client browser; and transmitting said modified response to said client browser for use thereby; and upon determining that said response would not require a plurality of communications:

transmitting said response to said client browser for use thereby.

27. The proxy server of claim 26, wherein:
said obtaining a response by said content server to said request performed over a first network that is relatively faster than a second network; and
said transmitting said modified response to said client browser is performed over said second network that is relatively slower than said first network.

28. The proxy server of claim 27, wherein said first network is a LAN, and said second network is a WAN.

29. The proxy server of claim 26, wherein said modifying said response includes computer-readable instructions that, when executed using said processor:
obtain said external information; and
modify said response to include said external information.

30. The proxy server of claim 26, wherein said response includes a redirection to another resource at a resource location distinct from a resource location from which said response was received.

31. The proxy server of claim 26, wherein said response includes a reference to a plurality of additional resources.

32. The proxy server of claim 31, wherein said modifying said response includes computer-readable instructions that, when executed using said processor:
enable said client browser to open a plurality of connections to servers containing said additional resources, beyond those connections ordinarily available without modifying said response, in order to download said additional resources in a parallel fashion.

33. The proxy server of claim 31, wherein said modifying said response includes computer-readable instructions that, when executed using said processor:
create one or more unique pseudonyms for a source of said additional resources; and
modify resource locations of said additional resources in said response to include said unique pseudonyms, the one or more unique pseudonyms to enable additional connections with the content server to be opened.

34. A non-transitory computer-readable medium on a single proxy server located between a content server and a client browser for reducing effects of latency on a network connecting at least said content server and said client browser, comprising logic instructions capable of being executed to perform operations comprising:
intercepting a request from said client browser for a resource at said content server; obtaining a response by said content server to said request;
evaluating whether said response would, if unmodified, require a plurality of communications by said client browser to said content server in the absence of said single proxy server;
upon determining that said response would require a plurality of communications:
obtaining information indicated by said response;
modifying said response to include the obtained information to reduce a network latency by causing a reduction in said plurality of communications by eliminating at least one additional access of said information by said client browser; and
transmitting said modified response to said client browser for use thereby; and
upon determining that said response would not require a plurality of communications:
transmitting said response to said client browser for use thereby.

35. The computer-readable medium of claim 34, wherein:
said obtaining a response by said content server to said request performed over a first network that is relatively faster than a second network; and
said transmitting said modified response to said client browser is performed over said second network that is relatively slower than said first network.

36. The computer-readable medium of claim 35, wherein said first network is a LAN, and said second network is a WAN.

37. The computer-readable medium of claim 34, wherein said modifying said response includes computer-readable instructions that, when executed using said processor:
obtain said external information; and
modify said response to include said external information.

38. The computer-readable medium of claim 34, wherein said response includes a redirection to another resource at a resource location distinct from a resource location from which said response was received.

39. The computer-readable medium of claim 34, wherein said response includes a reference to a plurality of additional resources.

40. The computer-readable medium of claim 39, wherein said modifying said response includes computer-readable instructions that, when executed using said processor:
enable said client browser to open a plurality of connections to servers containing said additional resources, beyond those connections ordinarily available without modifying said response, in order to download said additional resources in a parallel fashion.

41. The computer-readable medium of claim 39, wherein said modifying said response includes computer-readable instructions that, when executed using said processor:
create one or more unique pseudonyms for a source of said additional resources; and
modify resource locations of said additional resources in said response to include said unique pseudonyms, the one or more unique pseudonyms to enable additional connections with the content server to be opened.

42. Apparatus for reducing effects of latency on a network communication between a content server and a client browser, the apparatus comprising:
at a single proxy server between said content server and said client browser:
means for obtaining a response to a request from said client browser for a resource from said content server;
means for evaluating whether said response would, if unmodified, require a plurality of communications by said client browser to said content server in the absence of said single proxy server;
means for obtaining information indicated by said response;
means for modifying, upon determining that said response would require a plurality of communications, said response to include the obtained information to reduce a network latency by causing a reduction in said plurality of communications via eliminating at least one additional access of said information by said client browser; and
means for forwarding said modified response to said client browser for use thereby; and
means for forwarding said response to said client browser for use thereby upon determining that said response would not require a plurality of communications.

43. A method for reducing network latency on a network connecting a content server to a client browser, the method comprising:
at a single proxy server between said content server and said client browser:
intercepting a request from said client browser for a resource at said content server;
obtaining a response from said content server to said request;
evaluating whether said response is a redirection to another resource;
upon determining that said response is a redirection:
obtaining said another resource based on the determining that said response is said redirection to another resource; and
sending said another resource to said client browser, the sending of said another resource causing a reduction in communications by eliminating at least one additional access of information by said client browser for said another resource; and
upon determining that said response is not a redirection, sending said response to said client browser.

44. The method of claim 43, wherein:
said obtaining said another resource is performed over a first network that is relatively faster than a first network.

45. The method of claim 44, wherein said first network is a LAN said second network is a WAN.

46. The method of claim 43, further comprising between said obtaining said another resource and sending said another resource:
modifying said response to include said another resource.

47. A method for reducing network latency on a network connecting a content server to a client browser, the method comprising:
at a single proxy server between said content server and said client browser:
intercepting a request from said client browser for a resource at said content server;
obtaining a response from said content server to said request;
evaluating whether said response includes a reference to at least one additional resource external to said response;
upon determining that said response includes a reference to at least one additional resource external to said response:
obtaining said additional resource;
modifying said response to include said additional resource, the modifying of said response causing a reduction in communications by eliminating at least one additional access of information by said client browser; and
sending said modified response to said client browser; and
upon determining that said response does not include a reference to at least one additional resource external to said response, sending said response to said client browser.

48. The method of claim 47, wherein:
said obtaining said additional resource is performed over a first network that is relatively faster than a second network; and
said sending said modified response is performed over said second network that is relatively slower than said first network.

49. The method of claim 48, wherein said first network is a LAN, and said second network is a WAN.

50. The method of claim 47, wherein said modifying said response includes:
appending said additional resources to said response.

51. The method of claim 50 further comprising:
appending resource locations of said additional resources to said response.

52. The method of claim 47, conditioned upon latency testing, including determining and taking into account the effect of differential latency between a server-to-proxy network segment and a proxy-to-client network segment.

53. The method of claim 47, conditioned upon latency testing, including determining that an expected latency reduction exceeds an expected proxy server processing time.

54. The method of claim 47, wherein said obtaining a response includes obtaining said response from a cache.

55. The method of claim 47, wherein said modified response is in a so-called MIME HTML format.

56. The method of claim 47, conditioned upon determining that said client browser can recognize said modified response.

57. The method of claim 56, further comprising downloading a supplementary application to said client upon determining that said client browser cannot recognize said modified response.

58. A method for reducing network latency on a network connecting a content server to a client browser, the method comprising:
at a single proxy server between said content server and said client browser:
intercepting a request from said client browser for a resource at said content server;
obtaining a response from said content server to said request;
evaluating whether said response includes a reference to more than two additional resources external to said response;
upon determining that said response includes a reference to more than two additional resources external to said response:
modifying said response to include one or more unique pseudonyms to enable said client browser to download said additional resources at substantially the same time by enabling additional connections with the content server to be opened; and
sending said modified response to said client browser; and
upon determining that said response does not include a reference to more than two additional resources external to said response, sending said response to said client browser.

59. The method of claim 58, wherein said modifying said response includes:
creating the one or more unique pseudonyms for a source of said additional resources; and
modifying said response comprises modifying resource locations of said additional resources in said response to include said unique pseudonyms, the one or more unique pseudonyms to enable said additional connections with the content server to be opened.

60. The method of claim 59, further comprising:
adding one or more entries into a domain name server to link said unique pseudonyms to said proxy server.

61. The method of claim 59, further comprising:
adding one or more entries into a domain name server to link said unique pseudonyms to said source.

62. The method of claim 61, wherein said source is said content server.

63. The method of claim 58, wherein at least one of said additional resources is multiply referenced, and further comprising using a common pseudonym for said multiply-referenced additional resource.

64. The method of claim 58, wherein at least one of said additional resources is multiply referenced, and further comprising generating a common pseudonym for said multiply-referenced additional resource based on its content.

65. The method of claim 58, wherein at least one of said additional resources is multiply referenced, and further comprising generating a common pseudonym for said multiply-referenced additional resource based on its URL.

66. The method of claim 58, wherein at least one of said additional resources is referenced by a relative URL, and further comprising:
   converting said relative URL to an absolute URL; and
   introducing a unique pseudonym to said absolute URL.

67. The method of claim 1, wherein modifying said response comprises:
   determining that said response contains a reference to an embedded
   object; requesting said embedded object based; and
   appending said embedded object to said response.

68. The method of claim 67, wherein the embedded object is an image file.

* * * * *